3,205,130
PHOSPHORAMIDES AND THIOPHOSPHOR-
AMIDES AS INSECT CHEMOSTERILANTS
Paul H. Terry, College Park, and Alexej B. Borkovec, Kensington, Md., assignors to the United States of America as represented by the Secretary of Agriculture
No Drawing. Filed Dec. 24, 1964, Ser. No. 421,127
14 Claims. (Cl. 167—22)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

Insect chemosterilants are chemical compounds which when administered to an insect will make it sterile (i.e., incapable of producing offspring). When sterile insects are introduced into a population of normal, sexually reproducing insects, there will be a competition between the sterile and fertile individuals for a mate which will result in a decrease of the reproductive potential of the insect population. If the ratio of the sterile to fertile insects is made sufficiently large, a complete cessation of reproduction can be accomplished and the insect colony will die out.

An effective chemosterilant must have the following properties:

(a) Low toxicity toward the insect (i.e., all the important biological functions of the treated insect, with the exception of fertility, must remain the same or nearly the same as in untreated insects).

(b) High sterilizing activity (i.e., the sterilizing dosage must be substantially lower than the toxic or lethal dosage).

(c) Sufficient stability to allow formulation and application.

(d) High margin of safety to allow formulation and application without harmful effects on environment.

From the practical point of view one additional criterion is of importance. In most of the economically important insects the male can mate with several females whereas the female mates usually only once. Therefore, an effective chemosterilant must sterilize the males, or if possible both sexes.

Only one group of compounds has been hitherto known to approach the above-mentioned criteria. The compounds can be best described as biological alkylating agents, most importantly the derivatives of aziridine. Although the aziridinyl chemosterilants meet satisfactorily the criteria (a), (b), and (c), their potential mutagenic and general mitotic activity in warmblooded animals makes their safe practical application difficult and sometimes impossible, restricting their use to specially protected situations.

An object of the present invention is to provide chemosterilants effective with a diverse group of insect life.

Another object is to provide chemosterilants that have low toxicity toward both the insect to be controlled and the humans and other mammals that might be exposed to the chemosterilant.

A further object is to provide insect chemosterilants that have high sterilizing activity.

Still another object of the present invention is to provide insect chemosterilants of good chemical stability and thus retain their activity in the environment where applied.

We have discovered that certain amides and substituted amides of phosphoric acid and thiophosphoric acid are effective insect chemosterilants, have low toxicity to insects and mammals, and are stable in air as well as in dilute acids or bases at ambient temperatures.

According to the present invention insects are made sterile by contacting the insects with a compound of the formula

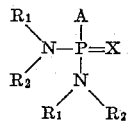

wherein X is oxygen or sulfur, $R_1$ and $R_2$ are hydrogen or the methyl or ethyl radical and A is another $R_1R_2N$— group or piperidino

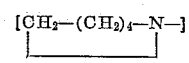

group.

Among the preferred compounds are those in which A is another amide group and both $R_1$ and $R_2$ are methyl groups, as in hexamethyl-phosphoramide (also known as hexamethylphosphoric triamide) and hexamethylthiophosphoramide. Hexaethylphosphoramide (also known as hexaethylphosphoric triamide) and substituted phosphoramides in which $R_1$ and $R_2$ are a mixture of methyl and ethyl groups are also effective chemosterilants, though less active than hexamethylphosphoramide. The compound in which A is a piperidino group and $R_1$ and $R_2$ are methyl (known as tetramethyl piperidinophosphonic diamide or tetramethyl piperidinophosphondiamide), and other compounds in which A is $R_1R_2N$— and X is sulfur, such as thiophosphoramide, in which $R_1$ and $R_2$ are hydrogen, and trimethylthiophosphoramide, in which $R_1$ is hydrogen and $R_2$ is methyl, are exemplified to further illustrate the chemosterilant activity of compounds of the foregoing formula.

The compounds are effective as insect sterilants by suppressing oviposition, by reducing or eliminating hatch of eggs, or by causing death of larvae which hatch from eggs laid by insects contacted by the compounds.

While the effectiveness of the chemosterilants of the present invention is illustrated with well-known insects, it will be apparent from the types of insects employed that the compounds have broad application in controlling insect population. The genera exemplified; Musca, Anastrepha, Cochliomyia, Drosophila, Anthonomous, Aedes, and Carpocapsa are representative of orders such as Coleoptera, Diptera and Lepidoptera from the division Endopterygota.

Various means of contacting the insect with a compound my be employed. The compounds are active as food additives, as residual coatings which the insects touch, by direct topical application to the insect body, or when injected into the insects.

Although for convenience of use in topical applications the compounds were usually dissolved in an organic solvent such as acetone, in other applications an aqueous medium was used, or the compound was incorporated directly into a food for ingestion by the insect. Those compounds which form stable salts with inorganic or organic acids can be conveniently employed in the salt form. Metal chelates and complexes of compounds of the Formula I may also have sterilizing properties.

The compounds are demonstrated to be highly effective chemosterilants. When incorporated into foods at the level of 0.25 to 1.0%, hexamethyl-phosphoramide was completely effective in sterilizing a variety of insects (Examples 1, 2, 3 and 5). When fed to females no eggs were laid. When fed to males, normal females cross-mated with these males produced eggs which did not hatch. Microgram quantities of the chemosterilant are effective even when the insect is contacted with the compounds by injection or topical application as in Examples 1, 2, 5 and 6.

Hexamethylphosphoramide complex with cobaltous chloride (Example 8) was also a highly effective chemosterilant. The egg hatch of house flies was reduced to zero with no increase in mortality of the flies over that of the controls which received no chemosterilant.

The narrow range of alkyl groups which can be used in $R_1$ and $R_3$ of the formula is indicated by the results of Examples 9 and 10. Hexaethylphosphoramide was somewhat less effective than the methyl substituted compound in reducing egg hatch and caused an appreciable increase in mortality of the insects.

Compounds of the general formula in which $R_1$ is methyl and $R_2$ is ethyl, as in Examples 16 and 17, have chemosterilant activity intermediate to that of hexamethylphosphoramide and hexaethylphosphoramide.

When one of the amide groups is replaced by a piperidino group the compound, in which $R_1$ and $R_2$ are methyl, as in Examples 18–20, has activity comparable to the phosphoric triamide of Examples 16 and 17.

Sulfur analogs, that is, compounds of the sole formula in which X is S, are effective chemosterilants. Of those exemplified, hexamethylthiophosphoramide was particularly effective, a zero egg hatch being obtained in the injection and topical application methods at lower levels than with hexamethylphosphoramide.

The following examples are presented to illustrate the process of the present invention, but are not intended to be in limitation thereof.

EXAMPLE 1.—CHEMOSTERILANT ACTIVITY OF HEXAMETHYLPHOSPHORAMIDE ON HOUSE FLIES (*Musca domestica*, L.)

House flies were contacted with hexamethylphosphoramide by injection, by topical application, and by addition to food so that the chemical was orally ingested.

In the first procedure, aqueous solutions of the compound were injected into the thorax of 10 male freshly emerged house flies which were subsequently caged with 5 freshly emerged virgin females. For the following 10 days all eggs laid by the females were collected and the percentage of egg hatch determined.

In the topical treatment, acetone solutions of the compound were applied to the dorsal side of a freshly emerged male house fly's thorax. The effects of the treatment were evaluated in the same way as in the injection method (Table 1).

In feeding experiments the compound was mixed with the flies' diet and the effects were evaluated as in the injection experiments.

The results are summarized in Table I. In all instances the mortality of the treated flies was the same as that of the controls.

Table 1.—*House fly sterilizing effects of hexamethylphosphoramide*

INJECTION METHOD

| Dosage | Egg Hatch (Percent) |
|---|---|
| µg./fly: | |
| 1.0 | 97 |
| 2.5 | 81 |
| 5.0 | 62 |
| 10.0 | 14 |
| 20.0 | 7 |
| 40.0 | 0 |

TOPICAL APPLICATION

| | |
|---|---|
| µg./fly: | |
| 5.0 | 69 |
| 10.0 | 87 |
| 25.0 | 52 |
| 50.0 | 9 |
| 100.0 | 0.2 |
| 200.0 | 0 |

ORAL APPLICATION

| | |
|---|---|
| Percent in food: | |
| 0.1 | 97 |
| 0.05 | 14 |
| 0.25 | 0 |
| 0.50 | 0 |

EXAMPLE 2.—CHEMOSTERILANT ACTIVITY OF HEXAMETHYLPHOSPHORAMIDE ON BOLL WEEVIL (*Anthonomus grandis*, BOH.)

Freshly emerged adult male weevils were fed for 3 days a diet containing hexamethylphosphoramide and then mated to virgin females. The eggs deposited by the fertilized females were collected and their hatch determined. The hatched larvae were allowed to pupate and the emergence of the second generation adults was determined. In the dipping experiments the adult males were dipped for a 2–15 sec. period in an aqueous solution of hexamethylphosphoramide containing 0.1% of a wetting agent. The hatch and emergence were determined as in the feeding experiment. The results are summarized in Table II. In all instances the mortality of the treated weevils was the same as that of the controls.

Table II.—*Boll weevil sterilizing effects of hexamethylphosphoramide*

ORAL APPLICATION

| Dosage | Egg Hatch (percent) | Emergence (percent) |
|---|---|---|
| Percent in food: | | |
| 0.05 | | 7 |
| 0.15 | | 8 |
| 0.5 | | 0 |

TOPICAL APPLICATION (DIPPING)

| | | |
|---|---|---|
| Percent solution: | | |
| 0.5 | 89 | 29 |
| 1.0 | 93 | 11 |
| 2.5 | 55 | 0 |
| 5.0 | 39 | 0 |

EXAMPLE 3.—CHEMOSTERILANT ACTIVITY OF HEXAMETHYLPHOSPHORAMIDE ON MOSQUITOES (*Aedes aegypti*, L.)

Young virgin male and female mosquitoes were fed in separate cages for 4 days a 20% honey solution containing 1% of hexamethylphosphoramide. The treated insects were then crossmated with untreated insects in separate cages. Normal females crossed with treated males produced eggs which did not hatch whereas treated females mated with normal males produced no eggs. The mosquito larvae exposed from the third instar until pupation of concentrations of 0.005–0.01% of hexamethylphosphoramide in the rearing water gave rise to adults which after mating produced eggs which were 99% non-viable. The mortality of treated mosquitoes was in all experiments equal to that of the controls.

EXAMPLE 4.—CHEMOSTERILANT ACTIVITY OF HEXAMETHYLPHOSPHORAMIDE ON MEXICAN FRUIT FLIES (*Anastrepha ludens* (LOEW))

The addition of 0.1% of hexamethylphosphoramide to the flies' diet reduced the egg hatch to 25%; the addition of 1% of the compound reduced the hatch to 3%; flies fed a diet containing 1.5% of the compound produced no eggs.

EXAMPLE 5.—CHEMOSTERILANT ACTIVITY OF HEXAMETHYLPHOSPHORAMIDE ON SCREW-WORM FLIES (*Cochliomyia hominivorae* (CQRL.))

The addition of 1% of hexamethylphosphoramide to the flies' diet reduced the egg hatch to 0%; the mortality of the treated flies was 60–80%. Topical application of a 10% aqueous solution of the compound reduced the egg hatch to 1%; the mortality of the treated flies was 35%.

EXAMPLE 6.—CHEMOSTERILANT ACTIVITY OF HEXAMETHYLPHOSPHORAMIDE ON CODLING MOTH (*Carpocapsa pomonella*, L.)

A solution of hexamethylphosphoramide was applied to the abdomen of adult male or female moths. Five treated moths were crossed with five untreated ones in wax-paper cages. The results of the experiments are summarized in Table III.

*Table III.—Codling moth sterilizing effects of hexamethylphosphoramide*

| Dosage, μg./moth | Sex Treated | No. of Eggs | Percent Hatch | Longevity, Days |
|---|---|---|---|---|
| 0 | | 600 | 79.6 | 10 |
| 150 | ♂ | 250 | 52 | 4.8 |
| 150 | ♀ | 56 | 53 | 6.4 |
| 300 | ♂ | 51 | 0 | 1.4 |
| 300 | ♀ | 0 | | 2.8 |

EXAMPLE 7.—CHEMOSTERILANT ACTIVITY OF HEXAMETHYLPHOSPHORAMIDE ON VINEGAR FLY (*DROSOPHILA MELANOGASTER* (MEIGEN))

A mixture of 1% hexamethylphosphoramide, 10% sugar, 4% dry yeast, and water was fed to freshly emerged male flies for 18-22 hours. The flies were subsequently mated to untreated females which were observed for 14-16 days. The flies laid a normal number of eggs but none of the eggs hatched. The mortality of treated flies was the same as that of the control.

EXAMPLE 8.—CHEMOSTERILANT ACTIVITY OF HEXAMETHYLPHOSPHORAMIDE COMPLEX WITH COBALTOUS CHLORIDE

ON HOUSE FLIES

The compound was evaluated as a food additive in the same manner as hexamethylphosphoramide. The results are summarized in Table IV. The mortality was the same as that of the controls.

*Table IV.—House fly sterilizing effects of hexamethylphosphoramide complex with cobaltous chloride*

ORAL APPLICATION

| Dosage | Egg Hatch (percent) |
|---|---|
| Percent in sugar-milk-egg mixture: | |
| 0.05 | 30 |
| 0.1 | 72 |
| 0.25 | 9 |
| 0.5 | 0 |
| 1.0 | 0 |

EXAMPLE 9.—CHEMOSTERILANT ACTIVITY OF HEXAETHYLPHOSPHORAMIDE ON HOUSE FLIES

The compound was evaluated as an additive to the flies' diet (sugar, dried milk, dried egg yolk); at 1% the number of eggs laid by the treated insects was reduced, the egg hatch was the same as that of the controls (95%), but only 65% of the emerged larvae reached the pupal stage. The mortality of treated flies was 30%.

EXAMPLE 10.—CHEMOSTERILANT ACTIVITY OF HEXAETHYLPHOSPHORAMIDE ON SCREW-WORM FLIES

The insects which were treated topically with a 10% acetone solution of the compound produced no eggs but the mortality of treated insects was 90%. Addition of 1% of the compound to flies' diet reduced the egg hatch to 10%, but the mortality was 96%.

EXAMPLE 11.—CHEMOSTERILANT ACTIVITY OF HEXAMETHYLTHIOPHOSPHORAMIDE ON HOUSE FLIES

The compound was evaluated in the same manner as the hexamethylphosphoramide and found to be two to four times as effective in the injection method and topical method as the hexamethylphosphoramide. The results are summarized in Table V.

*Table V*

INJECTION METHOD

| Dosage | Egg Hatch (percent) |
|---|---|
| μg./fly: | |
| 0.5 | 90 |
| 1.0 | 78 |
| 2.5 | 42 |
| 5.0 | 2 |
| 10.0 | 0 |

TOPICAL APPLICATION

| μg./fly: | |
|---|---|
| 10 | 90 |
| 25 | 33 |
| 50 | 7 |
| 100 | 0 |

ORAL APPLICATION

| | |
|---|---|
| 0.25% in sugar | 65 |
| 0.25% in mixture of sugar, dried milk, dried egg yolk | 0 |
| 0.5% in sugar or mixture | 0 |
| 1.0% in sugar or mixture | 0 |

EXAMPLE 12.—CHEMOSTERILANT ACTIVITY OF HEXAMETHYLTHIOPHOSPHORAMIDE ON SCREW-WORM FLIES

The compound was evaluated in the same manner as the hexamethylphosphoramide. Incorporation of 1% hexamethylthiophosphoramide in food caused the flies to produce a reduced quantity of eggs, none of which hatched. Mortality of treated flies was 69%. Topical application reduced the egg laying but did not affect the hatch.

EXAMPLE 13.—CHEMOSTERILANT ACTIVITY OF THIOPHOSPHORAMIDE ON HOUSE FLIES

Flies fed sugar containing 1% of the compound produced a normal number of eggs of which 19% hatched; however, none of the emerged larvae reached the pupal stage.

EXAMPLE 14.—CHEMOSTERILANT ACTIVITY OF TRIMETHYLTHIOPHOSPHORAMIDE ON HOUSE FLIES

Flies fed a mixture of sugar, dried milk, dried egg yolk, and 1% of the compound produced less eggs than the controls. Only 48% of the larvae that emerged reached pupal stage. The mortality of treated flies was the same as that of the controls.

EXAMPLE 15.—CHEMOSTERILANT ACTIVITY OF TRIMETHYLTHIOPHOSPHORAMIDE ON SCREW-WORM FLIES

Flies fed a diet containing 1% of the compound produced less eggs than the controls and none of the eggs hatched. The mortality of treated insects was 94%.

EXAMPLE 16.—CHEMOSTERILANT ACTIVITY OF N,N',N''- TRIMETHYL-N,N',N''- TRIETHYLPHOSPHORAMIDE ON HOUSE FLIES (*MUSCA DOMESTICA*, L.)

In feeding experiments the compound was mixed with the flies' diet. The results are summarized in Table VI.

Table VI
ORAL APPLICATION

| Dosage | Egg Hatch (percent) |
| --- | --- |
| Percent in food: | |
| 0.25 | 47 |
| 0.50 | 31 |
| 1.00 | 0 |

EXAMPLE 17.—CHEMOSTERILANT ACTIVITY OF N,N',N''- TRIMETHYL-N,N',N''- TRIETHYLPHOSPHORAMIDE ON MEXICAN FRUIT FLIES (*ANASTREPHA LUDENS* (LOEW))

The addition of 0.1% of N,N',N''-trimethyl-N,N',N''-triethylphosphoramide to the flies' diet reduced the egg hatch to 42%; the addition of 1% of the compound reduced the oviposition to 0% and 23% of the female flies died.

EXAMPLE 18.—CHEMOSTERILANT ACTIVITY OF N,N,N',N'-TETRAMETHYL-P - PIPERIDINOPHOSPHONIC DIAMIDE ON HOUSE FLIES (*MUSCA DOMESTICA*, L.)

In feeding experiments the compound was mixed with the flies' diet. The results are summarized in Table VII.

Table VII
ORAL APPLICATION

| Dosage | Egg Hatch (percent) |
| --- | --- |
| Percent in food: | |
| 0.25 | 39 |
| 0.50 | 42 |
| 1.00 | 0 |

EXAMPLE 19.—CHEMOSTERILANT ACTIVITY OF N,N,N',N'-TETRAMETHYL-P - PIPERIDINOPHOSPHONIC DIAMIDE ON SCREW-WORM FLIES (*COCHLIOMYIA HOMINIVORAE* (CQRL.))

The addition of 1% N,N,N',N'-tetramethyl-P-piperidinophosphonic diamide to the flies' diet reduced the egg hatch to 0%; the mortality of the treated flies was 64%. Topical application of a 5% aqueous solution of the compound reduced the egg hatch to 40%; the mortality of the treated flies was 10%.

EXAMPLE 20.—CHEMOSTERILANT ACTIVITY OF N,N,N',N' - TETRAMETHYL-P-PIPERIDINOPHOSPHONIC DIAMIDE ON MEXICAN FRUIT FLIES (*ANASTREPHA LUDENS* (LOEW))

The addition of 0.1% of N,N,N',N'-tetramethyl-P-piperidinophosphonic diamide to the flies' diet reduced the egg hatch to 77%; the addition of 1.0% of the compound reduced the hatch to 6%; 60% of the male flies died.

The utility of the process of the present invention in controlling insect population is readily apparent. Insects in their natural environment may be contacted with the chemosterilant or treated insects may be released in an infested area to disrupt the life cycle and result in a marked decrease or perhaps even the substantial elimination of undesirable insects.

We claim:

1. A method of causing sexual sterility in an insect comprising contacting the insect with a compound selected from the group consisting of

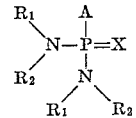

wherein X is selected from the group consisting of oxygen and sulfur, $R_1$ and $R_2$ are selected from the group consisting of hydrogen, methyl and ethyl, and A is selected from the group consisting of

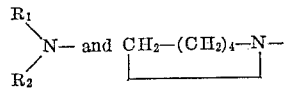

and a cobalt metal complex thereof.

2. A method of causing sexual sterility in an insect comprising contacting the insect with a compound selected from the group consisting of

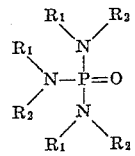

wherein $R_1$ and $R_2$ are selected from the group consisting of methyl and ethyl; and a cobalt metal complex thereof.

3. The method of claim 1 in which $R_1$ and $R_2$ are methyl.

4. The method of claim 3 in which the compound is hexamethylphosphoramide.

5. The method of claim 3 in which the compound is the cobaltous chloride complex of hexamethylphosphoramide.

6. The method of claim 2 in which $R_1$ is methyl and $R_2$ is ethyl.

7. The method of claim 6 in which the compound is N,N',N''-trimethyl-N,N',N''-triethylphosphoramide.

8. The method of claim 2 in which $R_1$ and $R_2$ are ethyl.

9. The method of claim 8 in which the compound is hexaethylphosphoramide.

10. The method of claim 1 in which the compound is N,N,N',N'-tetramethyl-P-piperidinophosphonic diamide.

11. A method of causing sexual sterility in an insect comprising contacting the insect with a compound of the formula

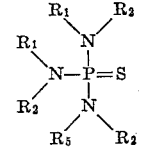

wherein $R_1$ and $R_2$ are selected from the group consisting of hydrogen, methyl and ethyl.

12. The method of claim 11 in which $R_1$ and $R_2$ are hydrogen.

13. The method of claim 11 in which $R_1$ is hydrogen and $R_2$ is methyl.

14. The method of claim 11 in which $R_1$ and $R_2$ are methyl.

No references cited.

JULIAN S. LEVITT, *Primary Examiner.*